United States Patent [19]

Murphy et al.

[11] Patent Number: 5,011,635
[45] Date of Patent: Apr. 30, 1991

[54] STEREOLITHOGRAPHIC METHOD AND APPARATUS IN WHICH A MEMBRANE SEPARATES PHASES

[75] Inventors: Edward J. Murphy, Arlington Heights; John J. Krajewski, Wheeling; Robert E. Ansel, Hoffman Estates, all of Ill.

[73] Assignee: DeSoto, Inc., Des Plaines, Ill.

[21] Appl. No.: 353,538

[22] Filed: May 18, 1989

[51] Int. Cl.$^5$ .............. B29C 35/08; B29C 41/00; B29C 71/04
[52] U.S. Cl. .................. 264/22; 118/423; 118/428; 118/429; 118/620; 156/275.5; 156/307.1; 156/379.6; 250/432 R; 250/492.1; 264/129; 264/236; 264/308; 425/174.4; 425/215; 427/53.1; 427/54.1; 427/393.5

[58] Field of Search ............... 264/22, 129, 236, 255, 264/298, 308, 347; 425/174, 174.4, 215; 427/53.1, 54.1, 393.5; 118/402, 428, 429, 620, 403, 423; 156/275.5, 307.1, 379.6, 272.8; 250/432 R, 492.1

[56] References Cited

U.S. PATENT DOCUMENTS 4,575,330  3/1986  Hull .................... 425/174.4

Primary Examiner—Jeffery Thurlow
Assistant Examiner—Leo B. Tentoni
Attorney, Agent, or Firm—Dressler, Goldsmith, Shore, Sutker & Milnamow, Ltd.

[57] ABSTRACT

The present invention contemplates a stereolithographic apparatus and method having a liquid organic phase and a fluid phase separated by a membrane that inhibits contact between the phases.

14 Claims, 2 Drawing Sheets

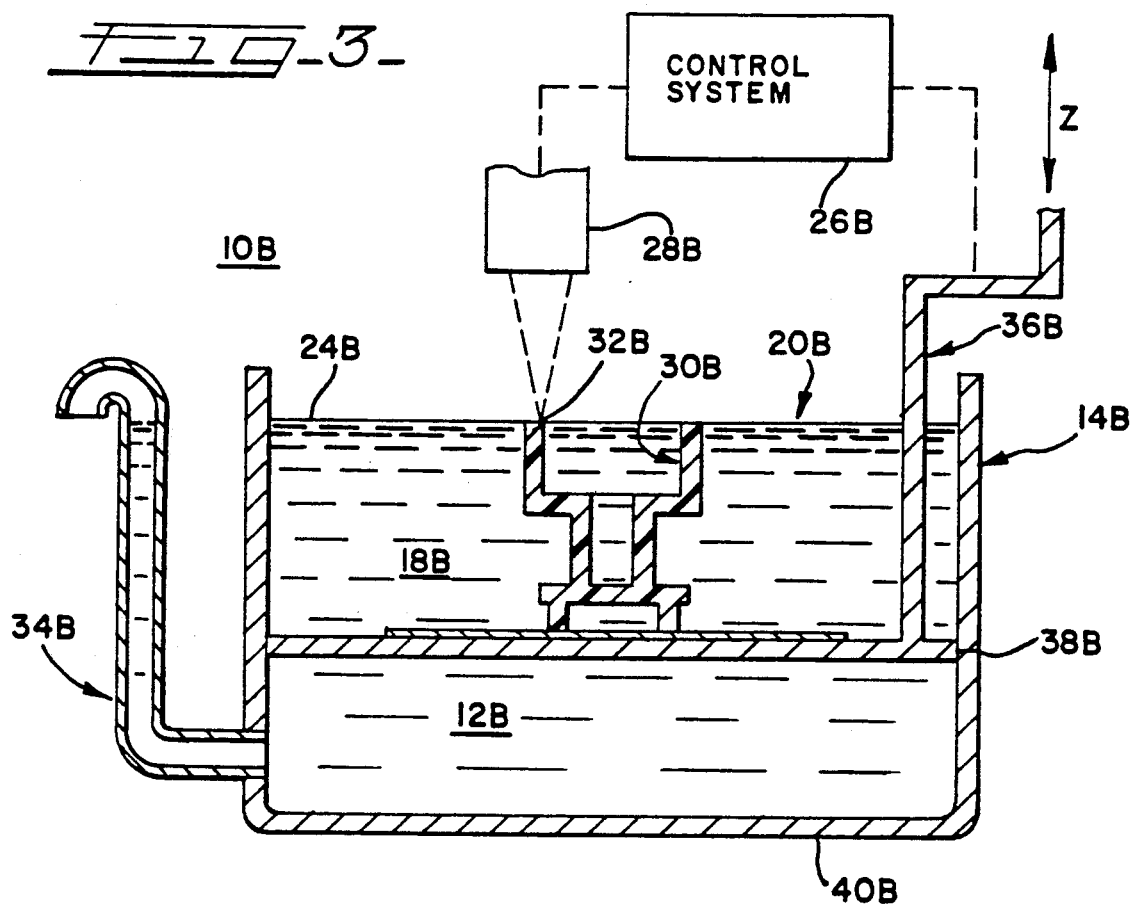
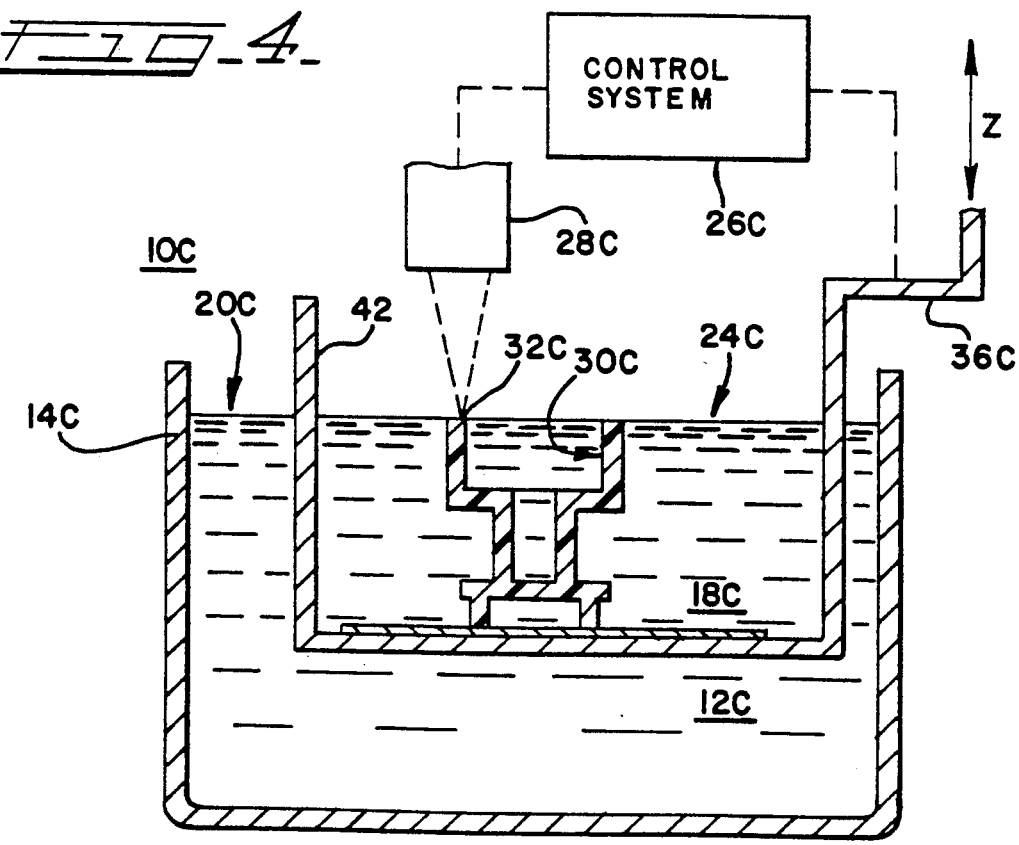

STEREOLITHOGRAPHIC METHOD AND APPARATUS IN WHICH A MEMBRANE SEPARATES PHASES

TECHNICAL FIELD

This invention relates to a stereolithographic method and apparatus in which a liquid organic phase and a fluid phase are separated by a membrane.

BACKGROUND OF THE INVENTION

Three-dimensional objects of complex shape can be formed utilizing a computer guided beam of light, typically ultraviolet light such as that from a laser, to polymerize a layer of a liquid, ultraviolet-curable, ethylenically unsaturated material at the surface of a liquid reservoir of such material. The polymerized layer is then coated with additional liquid ethylenically unsaturated material, as for example by lowering that layer into the reservoir, and the light is again utilized to polymerize the layer of ethylenically unsaturated material at the surface of the reservoir to produce another polymerized layer which adheres to the layer beneath it. These steps of coating and polymerizing superimposed layers of ethylenically unsaturated material which adhere to one another are repeated to produce a three-dimensional object. This process is well known in the prior art, e.g., U.S. Pat. No. 4,575,330 to Hull, and is known as "stereolithography".

The ethylenically unsaturated material conventionally includes acrylate and/or methacrylate constituents. These constituents are odorous, hazardous and costly. Therefore, special care must be taken in handling, storing, and disposing of these materials.

The reservoir used in the above process must be of sufficient size to accommodate the largest dimension of the object being formed, because the completed object is positioned entirely within the reservoir. Large objects thus require large reservoirs that contain large amounts of potentially hazardous ethylenically unsaturated material.

FIG. 4 of the Hull Patent, and the accompanying disclosure at column 9, line 46 to column 10, line 5, teaches floating the ultraviolet-curable liquid 22 on a heavier, ultraviolet transparent liquid layer 32. The ultraviolet light source 26 passes through the ultraviolet transparent liquid layer 32 and is focused at the interface between the ultraviolet-curable liquid 22 and the ultraviolet transparent liquid layer 32. As a result the object 30 is pulled up out of the ultraviolet-curable liquid 22 as it is formed. Hull asserts that a smaller volume of ultraviolet-curable liquid 22 is required since part of the object being formed can be raised out of the ultraviolet-curable liquid 22.

Although this procedure of Hull may be applicable to smaller objects, larger and heavier objects could be pulled off the support, or stretched to deform the object, due to their own weight. Hull's approach is therefore of limited value for the production of larger and heavier objects. No reduction in the volume of ultraviolet-curable liquid 22 is achieved if the volume of ultraviolet-curable liquid 22 is sufficient to contain, and thereby partially bear the weight of, the entire object to minimize the weight tending to pull the object from its support. In contrast, the present invention permits a reduction in volume of radiation-polymerizable liquid material, e.g., an ethylenically unsaturated material, while containing the entire object.

The Hull Patent does not suggest inhibiting the contacting of these two liquids 22 and 32, so there is nothing to prevent undesired interaction between these two liquids which can adversely effect the cure of the ultraviolet-curable liquid 22. However, the present invention inhibits interaction by separating the two phases.

Furthermore, the reservoir can become contaminated and unstable with use and with the passage of time. A larger reservoir increases the amount of waste of expensive material that can result from contamination and instability, and it also increases the disposal problem. The chemical instability of the material in the reservoir can result in an uncontrolled, exothermic polymerization. This can result in damage to equipment and it can even be explosive. The larger the quantity of hazardous material in the reservoir, the greater the problem. The present invention reduces the quantity of hazardous material present and thereby reduces the problem.

SUMMARY OF THE INVENTION

In accordance with the present invention, a stereolithographic apparatus and method for the formation of a three-dimensional object is disclosed. The apparatus of the present invention comprises a fluid phase, a substantially impermeable, movable membrane positioned on top of the fluid phase, a radiation-polymerizable liquid organic phase positioned on top of the membrane and a radiation source positioned above the organic phase.

The present method of producing three-dimensional objects by exposing a radiation-polymerizable liquid organic phase to radiation comprises the following steps: providing a fluid phase; providing a substantially impermeable, movable membrane positioned on top of the fluid phase; providing a radiation-polymerizable liquid organic phase on top of the membrane, the liquid organic phase having an upper surface; providing a radiation source positioned above the upper surface; and exposing at least a portion of the upper surface to radiation from said source to at least partially polymerize the liquid organic phase at and just below the upper surface to form a polymerized organic layer. Preferably, a support is also provided which is positioned immediately beneath the upper surface of the liquid organic phase prior to the exposing step. The polymerized organic layer adheres to, and becomes part of, the support upon polymerization during the exposing step. The fluid phase, membrane and organic phase can be in a suitable vessel to produce a reservoir.

A layer of liquid organic phase is then coated on the polymerized organic layer. This layer is then exposed to radiation to polymerize and solidify it. These steps are repeated, layer after layer, to form the desired three-dimensional object.

The membrane inhibits contact between the fluid phase and the liquid organic phase to minimize undesired interaction between these phases. The membrane can be lowered with respect to the upper surface during the formation of the object. Lowering of the membrane into the reservoir can expel fluid from the reservoir if desired.

While the present invention forms successive layers of partially polymerized cross sections of an object as disclosed in Hull, Hull does not disclose or suggest the use of a membrane to separate the two phases to permit a reduction in the volume of liquid organic phase while preventing interaction between the two phases.

The volume of liquid organic phase utilized in the present invention is reduced because a percentage of the total volume of the reservoir is constituted by the fluid phase, so less liquid organic phase can be utilized in the reservoir than conventionally required.

The reduction of the volume of radiation-polymerizable liquid organic phase reduces both the expense and the hazards of using these radiation-polymerizable compositions.

The membrane permits the use of constituents in either phase that will interact with constituents in the other phase. This is especially important when water is used in the fluid phase and a constituent in the liquid organic phase is soluble in, or reacts with, water.

The membrane can be flexible or rigid. When at least a segment of the membrane is rigid, the membrane can also be the support to which the polymerized organic layer adheres. Such a membrane is a support/membrane device.

Numerous other advantages and features of the present invention will be readily apparent from the following description of the preferred embodiments of the invention, the accompanying drawings and examples and the appended claims.

BRIEF DESCRIPTION OF THE DRAWINGS

In the drawings;

FIG. 3 is a combined block diagram, schematic and sectional view of an apparatus suitable for producing a three-dimensional object in a two phase reservoir having a membrane separating the phases and wherein the membrane is also a support; and, FIG. 4 is a combined block diagram, schematic and sectional view of an apparatus suitable for producing a three-dimensional object in a two phase reservoir having a membrane separating the phases, wherein the membrane is also a support and wherein all sides of the membrane partially extend out of the reservoir.

DESCRIPTION OF PREFERRED EMBODIMENTS

Although this invention is susceptible to embodiment in many different forms, some preferred embodiments of the invention are described herein in detail. It should be understood, however, that the present description is to be considered as an exemplification of the principles of this invention and is not intended to limit the invention to the embodiments illustrated.

The apparatus of the present invention comprises a fluid phase, a substantially impermeable, movable membrane positioned on top of the fluid phase, a radiation-polymerizable liquid organic phase positioned on top of the membrane and a radiation source positioned above the liquid organic phase. The membrane inhibits contact of the phases and migration of constituents of the phases therebetween. Movement of the membrane can change the proportion of liquid organic phase to fluid phase in a reservoir containing the fluid phase, membrane and liquid organic phase, as will be discussed hereinafter.

The liquid organic phase can be a liquid organic material that is more fully discussed hereinafter. The fluid phase, membrane and organic phase can be positioned within a container (vessel).

The present method of producing three-dimensional objects by exposing a radiation-polymerizable liquid organic phase to radiation comprises the following step: providing a fluid phase; providing a substantially impermeable, movable membrane positioned on top of the fluid phase; providing a radiation-polymerizable liquid organic phase on top of the membrane, the liquid organic phase having an upper surface; providing a radiation source positioned above the upper surface; and exposing at least a portion of the upper surface to radiation to at least partially polymerize the liquid organic phase at and just below the upper surface to form a polymerized organic layer.

Figure 1:
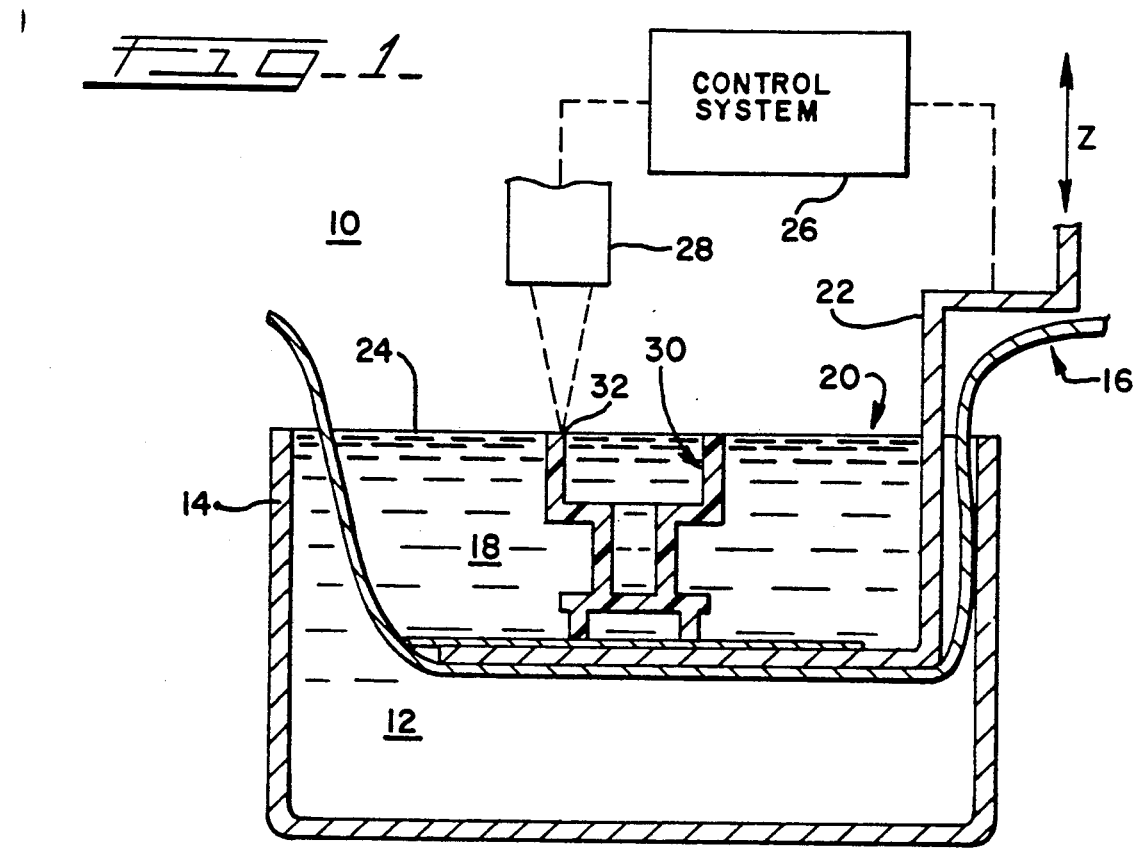
FIG. 1 is a combined block diagram, schematic and sectional view of an apparatus suitable for producing a three-dimensional object in a two phase reservoir having a membrane separating the phases.

The present invention can be utilized to form a three-dimensional object using a first embodiment of an apparatus 10 shown in FIG. 1. A fluid phase 12 is placed in a suitable vessel 14. A section of a membrane 16 is then placed in the vessel 14 on top of the fluid phase 12. The remaining portion of membrane 16 extends outside of the vessel 14. A desired amount of liquid organic phase 18 is introduced into the vessel 14 on top of the membrane 16 to produce a reservoir 20. The membrane 16 separates fluid phase 12 and organic phase 18 thereby inhibiting contacting of the phases.

A support 22 is preferably positioned immediately beneath an upper surface 24 of the liquid organic phase 18. The movement of the support 22 in the vertical direction, designated as "Z", is guided by a control system 26.

An illustrative conventional control system 26 is a computer such as a H-P Model 9872 Digital Plotter commercially available from Hewlett-Packard, Palo Alto, Calif.

A conventional radiation source 28 guided by the control system 26 is used to trace a cross section of the object 30 on the upper surface 24.

A radiation source 28 that is suitable for use herein emits radiation as actinic energy in the form of light in the ultraviolet or visible range, an electron beam, or the like. Radiation in and near the ultraviolet and visible light ranges, e.g., light having a wavelength of about 200 to about 500 nanometers, is preferred. An illustrative radiation source is a Liconix Model 4240 N, helium-cadmium light having an output of 15 milliwatts at 325 nanometers. When this light is focused to a diameter of 350 microns it yields an intensity of about 3.0 Joules per square centimeter of surface area. This intensity results in a single, polymerized layer that is about 20 mils thick.

A portion 32 of the upper surface 24 is exposed to radiation from the radiation source 28 in an amount effective to at least partially polymerize a layer of the liquid organic phase 18 at and just below the upper surface 24. The polymerized organic layer adheres to the support 22 and becomes part of the support 22 that is used for formation of subsequent polymerized organic layers.

The polymerized organic layer is then positioned immediately beneath the upper surface 24 and covered with fresh liquid organic phase 18 by lowering the support 22 with respect to the upper surface 24. The lowering can be performed by further submerging the support 22 into the reservoir 20, by raising the vessel 14 or by raising the level of the reservoir 20 as by introducing liquid organic material or fluid to the respective phase.

The steps of exposing the upper surface 24 to radiation and coating the polymerized organic layer with liquid organic phase 18 are repeated to produce layers of polymerized organic phase that adhere to each other. These successive layers are dimensionally stable, proportionally accurate cross sections of a three-dimensional object 30 which can be subsequently removed from the support 22.

The lowering of the support 22 into the reservoir 20 can cause the membrane 16 to be simultaneously lowered into the reservoir 20 or the membrane 16 can be lowered independently. Extra membrane is provided as needed from a membrane feed means (not shown). Liquid organic material is added to the liquid organic phase 18 as needed during the process. As the membrane 16 is lowered into the reservoir 20, fluid can be expelled and displaced from the the fluid phase 24 of vessel 18 into a receiving means (not shown), e.g., another vessel, a drain or the like. Alternatively, when gaseous or other compressible fluids are used, the membrane can be lowered without expelling the fluid.

The partially polymerized three-dimensional object 30 removed from the reservoir 20 is typically incompletely polymerized and somewhat gelatinous. This object is subsequently cured to a rigid solid by conventional means such as exposure to heat, light, polymerization catalysts, or some combination thereof. This object in rigid solid form is then used for its intended purpose.

The portion of the upper surface exposed to radiation can be traced in a desired pattern utilizing the control system to guide a radiation source as previously discussed. Alternatively, the desired pattern can be cut in a template that is positioned between the upper surface and the radiation source. A portion of the radiation from the source passes through the template in the desired pattern and polymerizes the upper surface in the shape of that pattern. The template can be changed during production of the object. The use of the template is not illustrated.

The membrane is composed of a material that is substantially impermeable to constituents that can be in the liquid organic phase or the fluid phase. Thus, the membrane inhibits osmosis therethrough of these constituents. Contact of the phases is thus inhibited. Furthermore, the material is chemically inert with respect to the phases and thus does not react therewith or decompose during the process.

Illustrative materials from which the membrane can be manufactured include polyethylene, copolymers of styrene such as styrene-butadiene, polytetrafluoroethylene, polyurethanes, 66 nylon, polypropylene, polyimides, polyethylene terephthalate and the like.

Commercially available materials suitable for use as the membrane include a 1.5 mils thick medium density polyethylene sheet (clear) from Vis Queen Ethyl Co., Richmond, Va, under the trade designation MD-30 and a 2.0 mils thick white polyethylene sheet from Quality Films Inc., Schoolcraft, Mich., under the trade designation LPF 13-W-SWS-TI.

The support can be a plate, screen or similar element to which the polymerized organic layer can removably adhere. The solidified organic layer becomes part of the support to receive a subsequently solidified cross section of organic phase as previously discussed. In some applications, e.g., when objects the thickness of a single polymerized organic layer at and just below the upper surface are desired, the support is not utilized.

The functions of the membrane and the support can be combined in a support/membrane device. In this form of the invention, at least the portion of the support that functions as the membrane is composed of the above-identified membrane material. The support/membrane device at least has a rigid segment and is capable of being positioned in the reservoir with the degree of precision required to produce the proportionally accurate three-dimensional object.

An exemplary radiation-polymerizable liquid organic material that is suitable for use as the liquid organic phase in the present stereolithographic process is an ethylenically unsaturated composition that polymerizes by a free-radical mechanism. The organic material comprises a resinous (meth)acrylate copolymerizable and cross-linkable component, having ethylenic unsaturation, dissolved in a liquid reactive diluent and a photoinitiator. The diluent is preferably an ethylenically unsaturated liquid that can comprise a liquid mono(meth)acrylate, a liquid poly(meth)acrylate, or a mixture of these liquids. An optional fluid phase-soluble constituent, e.g., a water-soluble constituent such as N-vinyl pyrrolidone, can also be present.

The term "(meth)acrylate", and various grammatical forms thereof, identifies esters that are the reaction product of acrylic or methacrylic acids with mono- or poly-hydroxy compounds, such as ethanol, butanol, ethylene glycol, trimethylol propane and the like.

The terms "(meth)acrylate copolymerizable and cross-linkable component" and "(meth)acrylate component", and various grammatical forms thereof, identify mono(meth)acrylates and poly(meth)acrylates. These terms also identify monomers and polymers that have a radiation-polymerization mechanism similar to (meth)acrylates.

The term "reactive diluent", and various grammatical forms thereof, identifies a diluent capable of dissolving, and copolymerizing with, the (meth)acrylate component.

Furthermore, the (meth)acrylate component and the fluid phase, e.g. water, can be partially miscible in each other. This partial miscibility results in dilution, and an increase in the viscosity, of the liquid organic phase which inhibits photopolymerization. Furthermore, the fluid phase can then be present in the object which weakens it. These problems are especially prevalent when ethoxy-modified or propoxy-modified (meth)acrylate components are utilized.

The resinous (meth)acrylate copolymerizable and cross-linkable component suitable for use in the present invention can contain a mixture of monomers and polymers and is subject to considerable variation. The resinous (meth)acrylate contains an average of at least about 1.2, and more preferably at least about 2.0 (meth)acrylate groups per molecule. The (meth)acrylate component should have a flowable viscosity and be stable at the operating conditions. The mixture of monomers and polymers is selected to achieve these ends.

These (meth)acrylate components are illustrated by the polyacrylate Cargill 1570, a diacrylate ester of bisphenol A having a number average molecular weight of about 700 daltons that is commercially available from Cargill, Carpentersville, Ill.

The term "dalton", as used herein in its various grammatical forms, defines a unit of mass that is 1/12th the mass of carbon-12.

The resinous (meth)acrylate component can also be a poly(meth)acrylate such as a diacrylate of an epoxy functional resin. Suitable diacrylates contain more than an average of about two (meth)acrylate groups per molecule. These diacrylates are exemplified by the commercial product Novacure 3700 available from Interez, Inc., Louisville, Ky., which is the diester of Epon 828 and acrylic acid. Epon 828 is an epoxy functional resin that is a diglycidyl ether of bisphenol A and is commercially available from Shell Chemicals, New York, N.Y. The number average molecular weight of Novacure 3700 is about 500 daltons and of Epon 828 is about 390 daltons.

Polyacrylate-modified polyurethanes are also useful as the resinous (meth)acrylate component, especially those polyurethanes that employ a polyester base. Particularly preferred are polyacrylate-capped polyurethanes that are urethane reaction products of a hydroxy-functional polyester, especially those polyesters having an average of about 2 to about 5 hydroxy groups per molecule, with a monoacrylate monoisocyanate, as illustrated below.

More particularly, the polyacrylate-modified polyurethane can be obtained from a polyester made by reacting trimethylol propane with caprolactone to a number average molecular weight of about 600 daltons followed by reaction of one molar proportion of the polyester with three molar proportions of the reaction product of 1 mol of 2-hydroxyethyl acrylate with 1 mol of isophorone diisocyanate. The end product of the reaction of the polyester with the reaction product of the acrylate and the diisocyanate is a polyurethane triacrylate. The urethane-forming reaction is conventionally performed at about 60° C. in the presence of about 1% by weight of dibutyltin dilaurate.

A commercial, polyester-based polyacrylate-modified polyurethane resin that is useful herein is Uvithane 893, available from Thiokol Chemical Corp., Trenton, N.J. The polyester in the Uvithane 893 product is a polyester of adipic acid with about 1.2 molar proportions of ethylene glycol polyesterified to an acid number of less than about 5. This polyester is converted as described above to a polyacrylate-modified polyurethane that is a semi-solid at room temperature and that has an average unsaturation equivalent of about 0.15 to about 0.175 ethylenically unsaturated groups per 100 grams of resin.

In polyester processing, the acid number, defined as the number of milligrams of base required to neutralize one gram of polyester, is used to monitor the progress of the reaction. The lower the acid number, the further the reaction has progressed.

An additional polyacrylate-modified polyurethane that is suitable as the (meth)acrylate component is the reaction product of 1 mol of isophorone diisocyanate, 1 mol of 2-hydroxyethyl acrylate and about 1 weight percent dibutyltin dilaurate reacted at a temperature of about 40° C. for a time period of 4 hours followed by reacting therewith 1 mol of a commercial hydroxy end-functional caprolactone polyester at a temperature of about 60° C. for a time period of about 2 hours. A suitable caprolactone polyester is the reaction product of 2 mols of caprolactone and 1 mol of ethylene glycol reacted at a temperature of about 60° C. for a time period of 4 hours. A suitable commercial caprolactone polyester is available from Union Carbide Corp., Danbury, Conn., under the trade designation Tone M-100 which has a number average molecular weight of about 345 daltons.

The resinous (meth)acrylate copolymerizable and cross-linkable component is dissolved in a liquid reactive diluent that preferably includes a polyethylenically unsaturated liquid material such as a poly(meth)acrylate. Liquid tri(meth)acrylates, e.g., trimethylol propane triacrylate, and di(meth)acrylates, e.g., 1,6-hexanediol di(meth)acrylate, are suitable. Liquid tetra(meth)acrylates, e.g., pentaerythritol tetraacrylate, are also useful. A preferred liquid poly(meth)acrylate is Sartomer C 9003, a polypropoxylate-modified diacrylate of neopentyl glycol with an average of two propylene oxide units per molecule and having a number average molecular weight of about 330 daltons that is commercially available from Sartomer, Westchester, Pa. Mixtures of these polyethylenically unsaturated materials can also be utilized.

The liquid reactive diluent also preferably includes a monoethylenically unsaturated liquid material such as a mono(meth)acrylate. Suitable materials include phenoxyethyl(meth)acrylate, hydroxyethyl(meth)acrylate, hydroxypropyl(meth)acrylate, N-vinyl pyrrolidone, and the like. Mixtures of these monoethylenically unsaturated materials are also suitable.

The liquid reactive diluent is preferably a mixture of monoethylenically and polyethylenically unsaturated materials in a weight ratio of about 4:1 to about 1:4, respectively.

A diluent that is non-reactive with the liquid organic phase can also be present in an amount up to about 50 weight percent based on the resinous (meth)acrylate component to obtain the desired viscosity of the organic phase. An illustrative diluent is n-hexanol.

Another illustrative radiation-polymerizable liquid composition suitable for use in the liquid organic phase is Potting Compound 363, a modified acrylate, commercially available from Locktite Corporation, Newington, Conn.

A process for making radiation-polymerizable liquid compositions suitable for use as the liquid organic phase is described in U.S. Pat. No. 4,100,141 to O'Sullivan.

A photoinitiator effective to initiate radiation-polymerization upon exposure to actinic energy such as light in or near the ultraviolet and visible ranges, e.g., light having a wavelength of about 200 to about 500 nanometers, is present in the radiation-polymerizable liquid organic phase. The radiation-polymerizable liquid organic phase of the present invention can be supplied without the photoinitiator, the photoinitiator being added prior to cure. These photoinitiators are themselves well known and in common use. They are usually ketonic, and frequently aromatic, such as the benzophenones. Darocur 1173 is a commercially available benzyl ketal-based photoinitiator from EM Chemicals that contains 2-hydroxy-2-methyl-1-phenyl-propane-1-one as the active ingredient that is a suitable photoinitiator. A commercially available aryl ketone photoinitiator, Irgacure 184, from Ciba Geigy Corp. that contains hydroxycyclohexyl phenyl ketone as the active ingredient is also suitable.

An optional, water-soluble constituent of this radiation-polymerizable liquid organic phase can be a liquid N-vinyl monomer (which functions as a reactive diluent) that has a radiation-polymerization mechanism similar to that of (meth)acrylates. Suitable N-vinyl monomers include N-vinyl pyrrolidone and N-vinyl caprolactam, with N-vinyl pyrrolidone being preferred and being the more water-soluble.

The resinous (meth)acrylate component is preferably present in an amount of about 15 to about 80, more preferably about 40 to about 70, weight percent of the liquid organic phase.

The liquid reactive diluent is preferably present in an amount of about 20 to about 85, more preferably about 30 to about 60, weight percent of the liquid organic phase.

The photoinitiator is present in an amount of about 1 to about 10 weight percent of the liquid organic phase.

The optional fluid phase-soluble constituent, when utilized, is present in an amount of about 10 to about 40 weight percent of the total weight of the resinous (meth)acrylate component, liquid reactive diluent, photoinitiator and fluid phase-soluble constituent. The resinous (meth)acrylate component, liquid reactive diluent and photoinitiator combined are therefore present in an amount of about 60 to about 90 weight percent of the above total weight.

A stabilizer and polymerization inhibitor can also be present in an amount less than about 1 weight percent of the liquid organic phase. Illustrative is methyl ether of hydroquinone.

The viscosity of the liquid organic phase is preferably about 200 to about 2000 centipoise, more preferably about 300 to about 800, centipoise when measured at a temperature of 24° C. using a conventional Brookfield viscometer operated in accordance with the instructions provided therewith. These measuring conditions and method were used to measure the viscosities provided herein.

The fluid phase is a material that can flow, or be compressed, under the processing conditions, e.g., temperature, pressure exerted by the membrane, and the like. The choice of fluid phase is dependent upon many factors including cost, operating conditions of the process, and the like. Suitable materials that can be used as the fluid phase include air, nitrogen, water, aqueous solutions, gases and other materials having a flowable viscosity at the operating conditions. The fluid phase can be incompatible with the organic phase and can contain constituents that are organic phase-soluble. Thus, at least one of the fluid phase and the organic phase can contain a constituent that is soluble in the other phase.

Furthermore, the fluid phase can be utilized to maintain, or change, the temperature of the organic phase as by circulating the fluid phase through a heat exchanger to raise, or lower, its temperature. The temperatures of the organic phase and the fluid phase will seek an equilibrium temperature and thus the temperature of the organic phase is controlled.

EXAMPLES 1 to 4, below, further illustrate radiation-polymerizable liquid organic phases suitable for use in the present invention. The components of the examples are admixed at about room temperature for a time period effective to produce a homogeneous mixture.

EXAMPLE 5, below, illustrates an adverse effect that can be caused by the migration of a water-soluble constituent of the liquid organic phase of EXAMPLE 1 into the fluid phase during the making of a three-dimensional object when the membrane is not utilized.

EXAMPLE 6, below, illustrates a method of making three-dimensional objects that can use the radiation-polymerizable organic phase illustrated in EXAMPLE 1 and the apparatus of FIG. 1 that includes the membrane.

These examples are presented by way of illustration, not limitation, of this invention.

EXAMPLE 1

A First Illustrative Radiation-Polymerizable Liquid Organic Phase

An illustrative radiation-polymerizable liquid organic phase suitable for use in the present invention can be produced by admixing 60 grams of a commercially available polyester-based polyacrylate-modified polyurethane, e.g., Uvithane 893 described hereinabove, 20 grams of trimethylol propane trimethacrylate, 20 grams of N-vinyl pyrrolidone and 4 grams of a benzyl ketal-based photoinitiator, e.g., Darocur 1173 described hereinabove. The viscosity of this liquid organic phase is about 1400 centipoise.

EXAMPLE 2

A Second Illustrative Radiation-Polymerizable Liquid Organic Phase

An illustrative radiation-polymerizable liquid organic phase suitable for use in the present invention can be an admixture that includes 25 parts by weight of a commercial, polyester-based polyacrylate-modified polyurethane, e.g., Uvithane 893 described hereinabove, 25 parts by weight of a commercial diacrylate of a diglycidyl ether of bisphenol A, e.g., Novacure 3700 described hereinabove, 20 parts by weight of N-vinyl pyrrolidone, 15 parts by weight of trimethylol propane trimethacrylate, 15 parts by weight of hydroxypropyl-(meth)acrylate, 4 parts by weight of a commercially available aryl ketone photoinitiator, e.g., Irgacure 184 described hereinabove, and 0.01 parts by weight of methyl ether of hydroquinone. The viscosity of this liquid organic phase is about 640 centipoise.

EXAMPLE 3

A Third Illustrative Radiation-Polymerizable Liquid Organic Phase

An illustrative radiation-polymerizable liquid organic phase suitable for use in the present invention can be an admixture that includes 30 parts by weight of a diacrylate of a diglycidyl ether of bisphenol A, e.g., Novacure 3700 described hereinabove, 20 parts by weight of a diester reaction product, having a number average molecular weight of about 1600 daltons, of acrylic acid and polymethylene glycol, 25 parts by weight of a polypropoxylate-modified diacrylate of neopentyl glycol with an average of two propylene oxide units per molecule, e.g., Sartomer C 9003 described hereinabove, 25 parts by weight of N-vinyl pyrrolidone, 4 parts by weight of a commercially available aryl ketone photoinitiator, e.g., Irgacure 184 described hereinabove, and 0.01 parts by weight of methyl ether of hydroquinone. The viscosity of this liquid organic phase is about 440 centipoise.

EXAMPLE 4

A Fourth Illustrative Radiation-Polymerizable Liquid Organic Phase

An illustrative radiation-polymerizable liquid organic phase suitable for use in the present invention can be an admixture that includes 25 parts by weight of a polyacrylate-modified polyurethane. This polyurethane is the reaction product of 1 mol of isophorone diisocyanate, 1 mol of 2-hydroxyethyl acrylate and about 1 weight percent dibutyltin dilaurate reacted at a temperature of about 40° C. for a time period of 4 hours followed by reaction at a temperature of about 60° C. for a time period of about 2 hours with 1 mol of a commercial hydroxy end-functional caprolactone polyester, e.g., Tone M-100 described hereinabove. The polyacrylate-modified polyurethane is admixed with 25 parts by weight of a commercial diacrylate of a diglycidyl ether of bisphenol A, e.g., Novacure 3700 described hereinabove, 25 parts by weight of a polypropxylate-modified diacrylate of neopentyl glycol with an average of two propylene oxide groups per molecule, e.g., Sartomer C 9003 described hereinabove, 25 parts by weight of N-vinyl pyrrolidone, 4 parts by weight of a commercially available aryl ketone photoinitiator, e.g., Irgacure 184 discussed hereinabove, and 0.01 parts by weight of methyl ether of hydroquinone. This liquid organic phase has a viscosity of about 208 centipoise.

EXAMPLE 5

Producing a Three-Dimensional Object From a Reservoir Not Including a Membrane

A three-dimensional object was attempted to be produced utilizing an apparatus similar to the one shown in FIG. 1 but without the membrane 16. The liquid organic phase of EXAMPLE 1 which includes N-vinyl pyrrolidone as a water-soluble constituent was used. A fluid phase that was used is water. The radiation-polymerizable liquid organic phase was polymerized utilizing an ultraviolet light produced by a Liconix Model 4240 N, helium-cadmium light having an output of 15 milliwatts at 325 nanometers focused to a diameter of 350 microns. The radiation source and the support were controlled by a H-P Model 9872 Digital Plotter commercially available from Hewlett-Packard, Palo Alto, Calif. The N-vinyl pyrrolidone migrated into the water during production of the object. Migration changed the composition of the organic phase which became more viscous, slower curing and chemically unstable, i.e., the organic phase became unsuitable for making objects. The physical properties, e.g. green strength, of objects so produced was decreased. All observations were made visually and are compared to compositions and objects wherein the N-vinyl pyrrolidone did not migrate.

EXAMPLE 6

Method of Producing Three-Dimensional Objects From a Reservoir Including a Membrane A three-dimensional object was produced utilizing the apparatus shown in FIG. 1 and the radiation-polymerizable organic phase of EXAMPLE 1 that includes N-vinyl pyrrolidone as a water-soluble constituent. A fluid phase that was utilized is water. The membrane utilized was a 1.5 mil thick medium density polyethylene sheet (clear), commercially available from Vis Queen Ethyl Co., Richmond, Va, under the trade designation MD-30. The radiation source and the support were controlled by a H-P Model 9872 Digital Plotter commercially available from Hewlett-Packard, Palo Alto, Calif. The radiation-polymerizable liquid organic phase was polymerized utilizing an ultraviolet light produced by a Liconix Model 4240N, helium-cadmium light having an output of 15 milliwatts at 325 nanometers focused to a diameter of 350 microns. The operation of the apparatus shown in FIG. 1 is discussed hereinabove. The membrane inhibited migration of the N-vinyl pyrrolidone into the water during production of the object. Thus, the composition of the organic phase was not changed by migration and the organic phase was suitable for producing objects.

Figure 2:
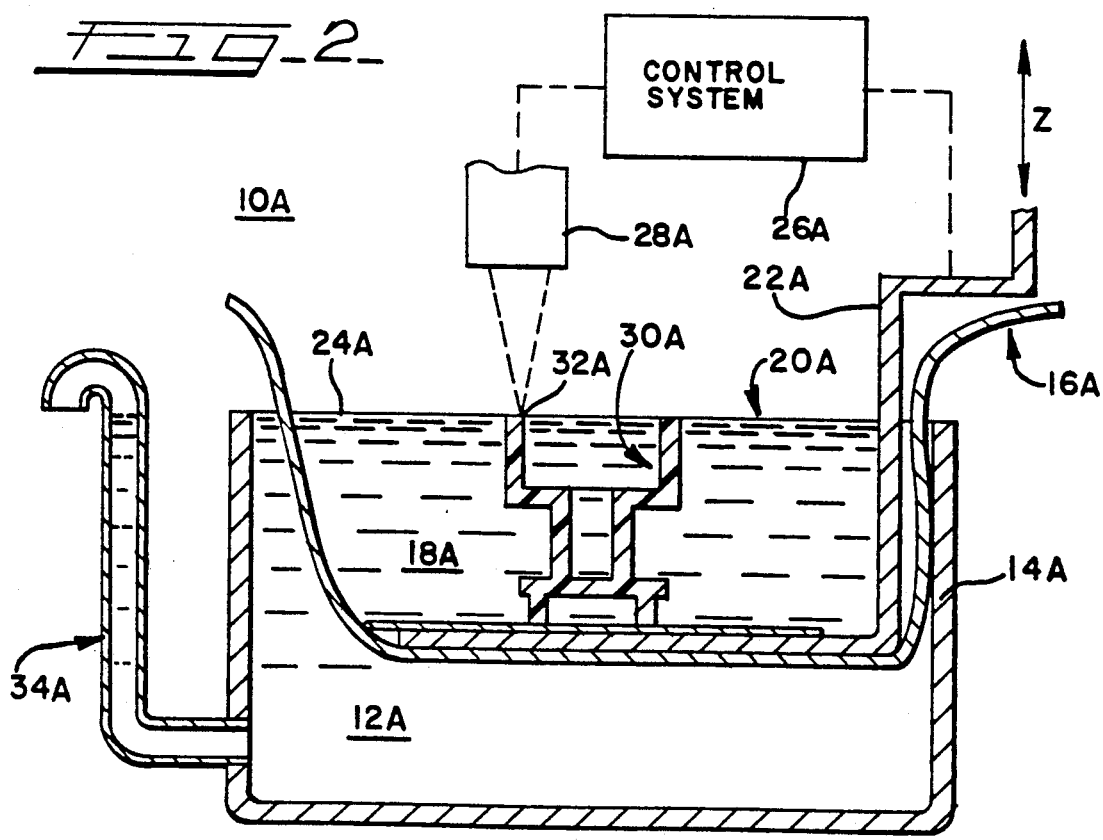
FIG. 2 is a combined block diagram, schematic and sectional view of an apparatus suitable for producing a three-dimensional object in a two phase reservoir having a membrane separating the phases and a fluid phase relief column.

FIGS. 2 to 4 provide illustrations of alternative embodiments of apparatuses for practicing the present invention albeit other apparatuses are possible.

A second embodiment of an apparatus 10A effective to practice the present invention is shown in FIG. 2. The vessel 14A is provided with a fluid phase relief column 34A that is in fluid communication with fluid phase 12A. During the process as described hereinabove with regard to FIG. 1, fluid can be discharged from the reservoir 20A via relief column 34A when the membrane 16A is lowered into the reservoir 20A.

A third embodiment of an apparatus 10B effective to practice the present invention is shown in FIG. 3. In this embodiment, the support and membrane are combined as a support/membrane device 36B. Contact point 38B of the support/membrane device 36B and the walls of vessel 14B is organic phase and fluid phase tight, i.e., organic phase or fluid phase cannot flow pass the contact point. During the process as described hereinabove with regard to FIG. 1, lowering the support/membrane device 36B into the reservoir 20B can cause fluid to be discharged from the vessel 14A via fluid phase relief column 34B.

In an alternative embodiment having the support/membrane device 36B of FIG. 3, bottom 40B of vessel 14B and relief column 34B are not necessary if the fluid phase 12B is a gas. This embodiment is not shown.

A fourth embodiment of an apparatus 10C effective to practice the present invention is shown in FIG. 4. In this embodiment, the support and membrane are combined as a support/membrane device 36C having sides 42C that partially extend above the upper surface 24C and out of the reservoir 20C. The sides 42C, shown here as being rigid, alternatively can be flexible. During the process as described hereinabove with regard to FIG. 1, fluid can be displaced from the vessel 14C, or compressed, as the support/membrane device 36C is lowered into the reservoir 20C. Additional liquid organic material can be added to the liquid organic phase 18C within the support/membrane device 36C as desired.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed is:

1. An apparatus for producing a three-dimensional object comprising means for containing a fluid phase positioned therein, a substantially impermeable, movable membrane positioned on top of the fluid phase in said first recited means, a radiation-polymerizable liquid organic phase positioned in the containing means on top of the membrane such that contact of the phase is inhibited, a radiation source positioned above the liquid organic phase adapted to radiate the liquid organic phase to form a polymerized organic layer, movable support means and means for forming and combining successive adjacent polymerized organic layers to form a three-dimensional object.

2. The apparatus in accordance with claim 1 wherein the organic phase has an upper surface and wherein said support means is initially positioned in the liquid organic phase just below the upper surface.

3. The apparatus in accordance with claim 1 wherein at least a segment of the membrane is rigid.

4. The apparatus in accordance with claim 3 wherein the membrane is the support means.

5. The apparatus in accordance with claim 1 further comprising a relief means in communication with the fluid phase.

6. A method of producing a three-dimensional object comprising the steps of:
  (a) providing a fluid phase in a container;
  (b) providing a substantially impermeable, movable membrane positioned on top of the fluid phase;
  (c) providing a radiation-polymerizable liquid organic phase positioned on top of the membrane, the liquid organic phase having an upper surface;
  (d) providing a radiation source positioned above the upper surface;
  (e) exposing at least a portion of the upper surface to radiation in an amount effective to at least partially polymerize the liquid organic phase at and just below the upper surface to form an at least partially polymerized organic layer;
  (f) covering the at least partially polymerized organic layer with additional liquid organic phase, the additional liquid organic phase having an upper surface;
  (g) exposing at least a portion of the upper surface to radiation in an amount effective to at least partially polymerize the additional liquid organic phase at and just below the upper surface to form another at least partially polymerized organic layer; and
  (h) repeating steps (f) and (g) to form a three-dimensional object.

7. The method in accordance with claim 6 wherein at least one of the fluid phase and the organic phase includes a constituent soluble in the other phase.

8. The method in accordance with claim 7 further comprising lowering the membrane with respect to the upper surface to cover an at least partially polymerized organic layer with additional liquid organic phase.

9. The method in accordance with claim 6 wherein at least a segment of the membrane is rigid.

10. The method in accordance with claim 9 wherein the membrane is a support means to which the polymerized organic layer adheres to, and becomes part of, upon polymerization.

11. The method in accordance with claim 6 further comprising the step of:
  (d) providing movable support means positioned immediately beneath the upper surface and above said movable membrane so that the at least partially polymerized organic layer adheres to, and becomes part of the movable support means upon polymerization.

12. The method in accordance with claim 11 wherein at least one of the fluid phase and the organic phase includes a constituent that is soluble in the other phase.

13. The method in accordance with claim 11 further comprising lowering the support means and membrane simultaneously with respect to the upper surface to cover an at least partially polymerized organic layer with additional liquid organic phase.

14. The method in accordance with claim 11 wherein at least a segment of the membrane is rigid.

* * * * *